Patented June 17, 1930

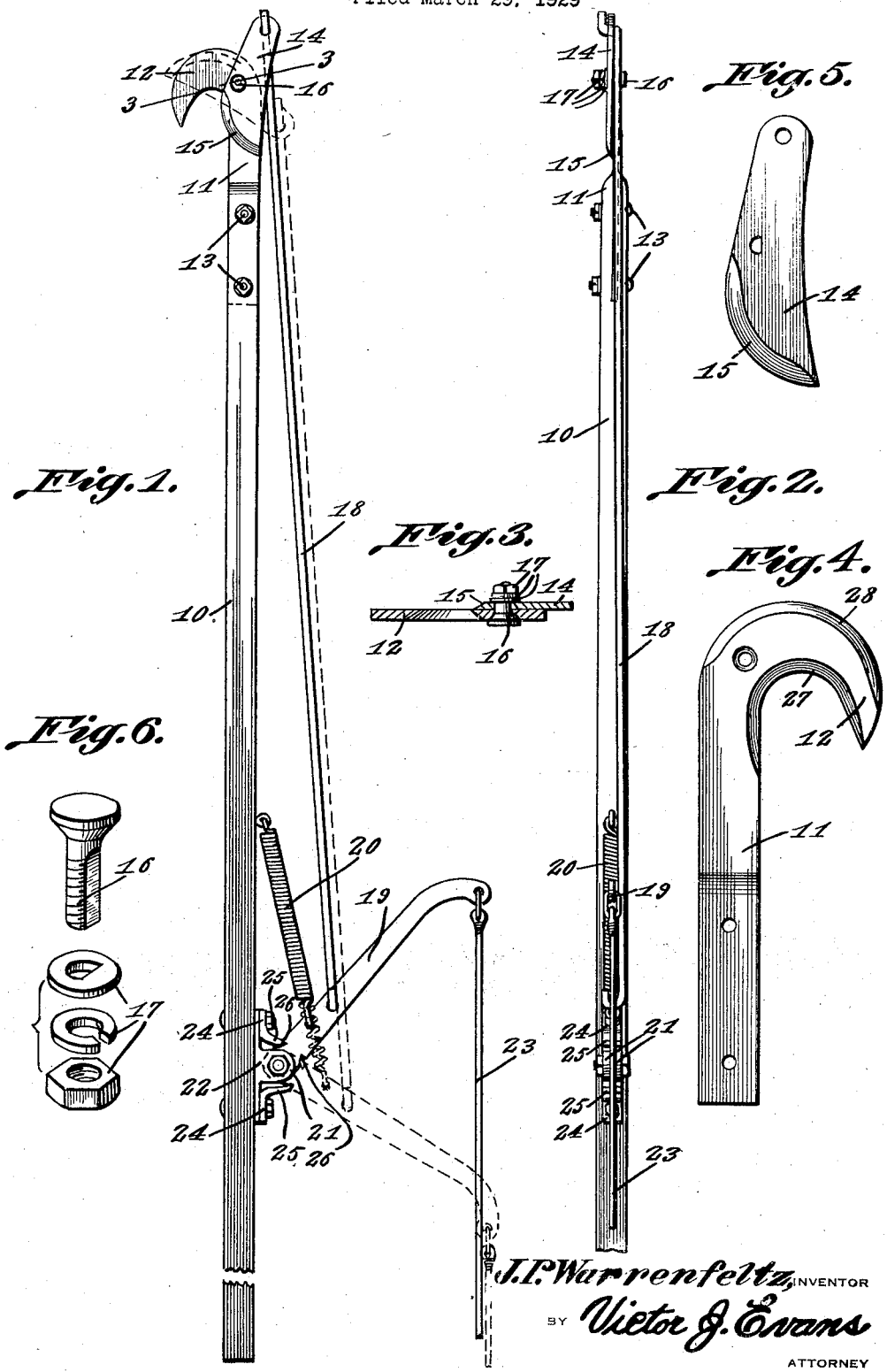

1,765,187

UNITED STATES PATENT OFFICE

JOHN P. WARRENFELTZ, OF ELYRIA, OHIO

TREE PRUNER

Application filed March 29, 1929. Serial No. 351,047.

The present invention comprehends the provision of a tree pruning tool.

Tools of the character above mentioned, with which I am acquainted do not measure up to the requirement for clean standardized workmanship, in that the average pruner bruises and damages the cambium of the branches or limbs of a tree, and causes them to lose their vitality and subsequently die. Any branch or limb that has a bruised bark is the inroad to fungus and decay, and it is highly important in a tool of the above mentioned character, to sever or cut the limb or branch through the cambium layer so as not to break the fibers in the green live growth and not damage the health of the tree.

It is therefore the purpose of the present invention to provide a tool of the above mentioned character which will absolutely make a clean cut, will not jam and constructed to stand hard usage.

One of the chief characteristics of the present invention resides in the provision of a tool head in the form of a hook, the outer edge and one side of which are beveled and concaved so that the slightest pressure on the pull rod will effect a clean and smooth cut, the construction allowing the latter to cut the limb or branch through the cambium layer without doing any damage to the fibers in the green live growth, cutting the limb or branch clean to allow it to quickly heal and thus preserve the sap or life of the tree.

Another important object of the invention resides in the provision of a novel construction of means for limiting the movement of the hand actuated lever in opposite directions, which lever is utilized to control the movements of the cutting blade, the latter being spring influenced to provide for a strong and quick release of the blade after each operation.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views, and wherein:—

Figure 1 is a side elevation of the tool forming the subject matter of the present invention.

Figure 2 is a view taken at a right angle to Figure 1.

Figure 3 is a sectional view on line 3—3 of Figure 1.

Figure 4 is a detail view of the hook.

Figure 5 is a detail view of the movable cutting blade.

Figure 6 is a detail view of the bolt, washers and nut.

Referring to the drawing in detail, 10 indicates a pole which may vary in length, and also in size and cross sectional contour without departing from the spirit of the invention. This pole is preferably bifurcated at its upper end to receive the shank 11 of the tool head, which terminates to provide a hook 12 as illustrated. The shank 11 is secured to the pole by suitable fastening bolts 13. Pivoted upon the shank 11 is a cutting blade 14 having its active edge beveled as at 15, the pivot bolt 16 therefor and the opening in the blade receiving said bolt, preferably being provided with flat sides or edges, whereby the bolt and blade turn together on the shank 11, incident to the operation of the blade.

A nut and washer 17 are associated with the pivot bolt to hold the blade properly positioned thereon and to provide for a smooth operation of the blade. This construction also allows the blade to be quickly and easily separated from the bolt when desired to sharpen the blade or for any other purpose.

One end of the blade 14 is connected in any suitable manner with a pull rod 18, the lower end of which is connected with a lever 19 at an appropriate point in its length, the lever being also connected with one end of a retractile spring 20, which has its opposite end secured to the pole 10 as illustrated. The lever 19 has one end pivoted between a pair of spaced apertured ears 21 projecting centrally from a bracket plate 22 secured to the pole 10 at an appropriate point in its length, while depending from the free end of the lever 19 is an operating cord 23, by means of which the lever can be manipulated from a remote point. Supported upon the bracket plate 22 above and below the apertured ears 20 are lugs 24, each being provided with an outstanding flange 25 to cooperate with the lever 19 and thereby limit the movement of the latter in either direction. For this purpose the lever 19 is formed with notches 26 at opposite sides of the pivot, with the notches so located to receive one or the other of the flanges 25 incident to the operation of the lever as will be readily understood.

Upon reference to the drawing it will be noted that the hook 12 of the head of the tool has one side beveled and concaved to the cutting edge thereof as at 27, this beveled portion also extends an appreciable distance down the shank 11, to cooperate with the beveled edge of the blade 14 to insure a clean smooth cut of the limb in a manner to prevent breaking or damage to the fibers in the green live growth and thus preserve the life of the tree. The construction permits the tool to cut the limb or branch on the farthest side of the latter through the cambium layer, the cutting edge of the hook meeting the cutting edge of the knife in a manner to insure a smooth clean cut so that the limb or branch can quickly heal, and thus preserve the sap and vitality of the limb and tree. It will also be noted that the same side of the hook 12 around the outer edge thereof is beveled as at 28 to allow the tool to be properly located on the limb or branch to be severed in close quarters. The spring 20 affords the tool a quick and strong release action of the blade, which also operates to insure a clean cut without damage to the bark.

While it is believed that from the foregoing description the nature and advantages of the invention will be readily apparent, I desire to have it understood that I do not limit myself to what is herein illustrated and described, and that such changes may be resorted to when desired as fall within the scope of what is claimed.

What I claim is:—

A tree pruning tool of the character described comprising a pole, a head including a shank secured to one end of the pole and terminating to provide a hook, one side of the hook being beveled and concaved to the cutting edge thereof and also extended along the shank for a portion of its length, a cutting blade pivoted upon the shank adjacent the hook and having a beveled cutting edge cooperating with the corresponding edge of the hook and shank, a lever pivoted upon the pole, a pull rod terminally connected with the cutting blade and lever, a coil retractile spring terminally connected with the lever and pole, said lever having notches in its opposed longitudinal edges adjacent the pivot therefor, and flanges supported by the pole and adapted to be singly received by one of said notches to limit the movement of said lever in opposite directions.

In testimony whereof I affix my signature.

JOHN P. WARRENFELTZ.